United States Patent [19]

Castrigno et al.

[11] Patent Number: 5,066,037
[45] Date of Patent: Nov. 19, 1991

[54] INSTRUMENT PANEL WITH AIRBAG DEPLOYMENT DOOR

[75] Inventors: Steven Castrigno, Somersworth; Scott E. Rafferty; Lawrence R. Nichols, both of Dover, all of N.H.; Claude Bemis, York, Me.

[73] Assignee: Davidson Textron Inc., Dover, N.H.

[21] Appl. No.: 570,787

[22] Filed: Aug. 22, 1990

[51] Int. Cl.⁵ .............................................. B60R 21/16
[52] U.S. Cl. ........................................ 280/732; 280/743
[58] Field of Search ................ 280/728, 731, 732, 743

[56] References Cited

U.S. PATENT DOCUMENTS

| | | | |
|---|---|---|---|
| 3,794,349 | 2/1974 | Fuller | 280/732 |
| 3,817,552 | 6/1974 | Knight, IV et al. | 280/732 |
| 3,904,222 | 9/1975 | Bursott et al. | 280/732 |
| 4,327,937 | 5/1982 | Scholz et al. | 280/732 |
| 4,893,833 | 1/1990 | DiSalvo et al. | 280/732 |

Primary Examiner—Kenneth R. Rice
Attorney, Agent, or Firm—John C. Evans

[57] ABSTRACT

A releasable latch (50) is provided for a door assembly (14) having an outer skin member, a foam backing member, and an inner door member. The door assembly conceals an airbag restraint system having a housing, an airbag and a gas generator producing an inflatant for inflating the airbag for deploying the airbag through the door assembly. The releasable latch has a closed U-shaped end that is press fit in an open U-shaped end on a retainer member on the housing to hold the door assembly in a mating relationship to interior trim parts. The inner door member is engaged during initial inflation of the airbag to displace the door assembly so as to bend the inner door member at a hinge joint between the outer cover member and the interior trim part and the press fit between the closed U-shaped end and the open U-shaped end provides easy opening of the door assembly as the airbag is inflated.

8 Claims, 2 Drawing Sheets

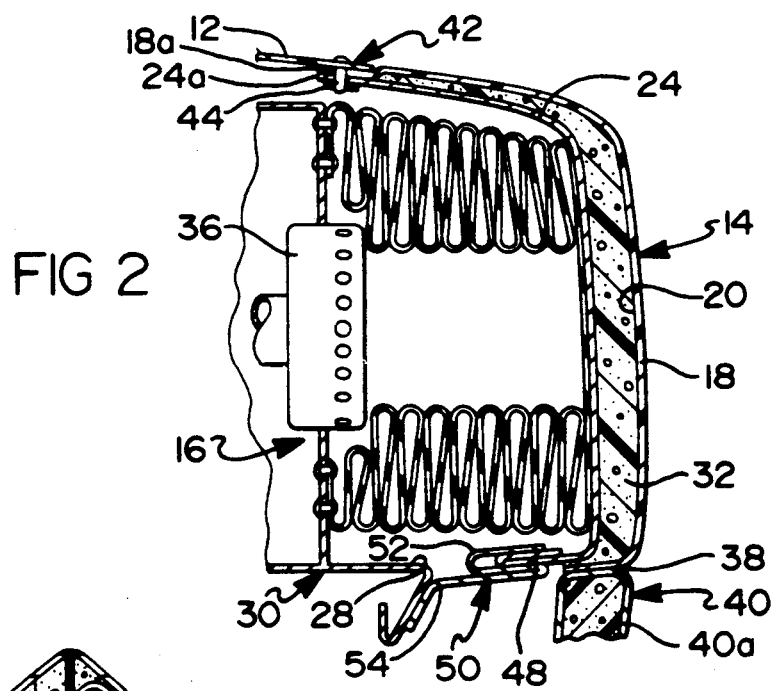
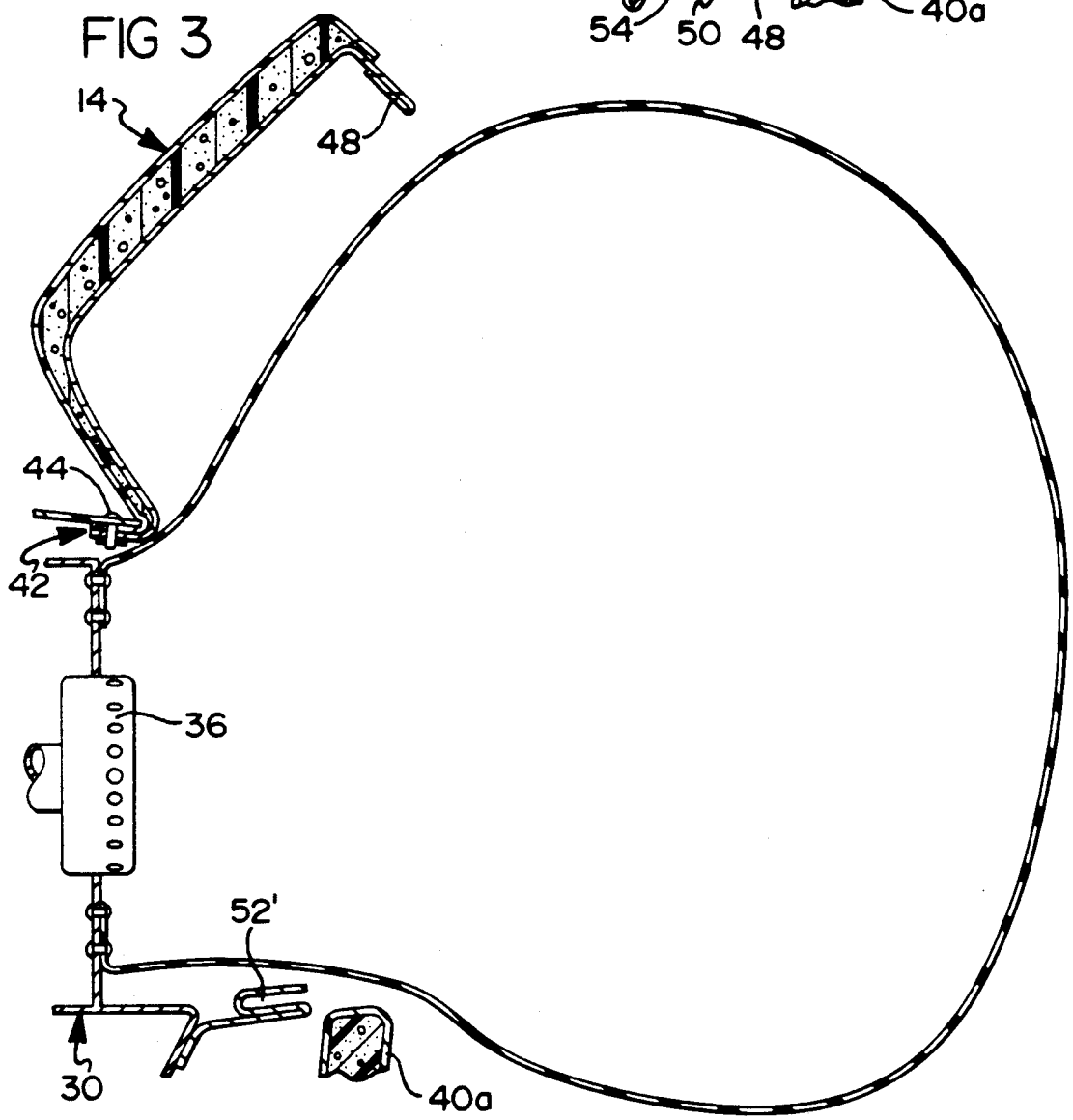

INSTRUMENT PANEL WITH AIRBAG DEPLOYMENT DOOR

FIELD OF THE INVENTION

This invention relates to airbag restraint systems for vehicles and more particularly to such airbag restraint systems which are covered by a door assembly for concealing the airbag restraint system in a vehicle passenger compartment.

BACKGROUND OF THE INVENTION

Various airbag restraint systems are known in which a door covers the airbag restraint components prior to deployment of an airbag into the vehicle passenger compartment.

U.S. Pat. No. 3,622,176 discloses a cover with a perforated outer skin. The problem with such an arrangement is that weakened sections of the perforated outer skin tend to collapse inwardly to be visible and thus do not fully conceal the underlying airbag restraint system. Furthermore, such systems depend upon the force of the inflating airbag to tear the cover to form a deployment opening therein. Such tearing can at times hinder deployment in an undesirable manner.

U.S. Pat. No. 3,708,179 discloses a door assembly for an airbag restraint including two recessed metal doors that hinge open when the airbag is deployed.

U.S. Pat. No. 4,097,064 discloses a cover assembly which carries a cutter to pierce the outer skin of the cover assembly. However, the '064 arrangement requires a separate inertially responsive shield for protecting the airbag during its deployment.

U.S. Pat. No. 4,246,213 discloses a cover assembly that includes a cover having weakened sections in the outer shell or skin of a cover assembly. The '213 arrangement depends upon tearing of the outer skin at the weakened sections for airbag deployment and presents the same disadvantages as in the case of the '176 patent.

U.S. Pat. No. 4,327,937 discloses a door for an airbag restraint system formed by molding a boundary edge on an all plastic door for retention in a fixed body part.

SUMMARY OF THE INVENTION

In cases where the outer skin of an airbag restraint door is formed to define a tear seam that is broken when the door opens, it has been found that such seams have differing physical properties that can require a widely variable force to open the door over the operating temperature range to which such systems are exposed.

The variation in physical properties can cause a variation in the opening force and thus produce a non-consistent deployment of the airbag. Methods of deployment that include hinging and tethering also tend to be extremely temperature dependent.

Accordingly, a feature of the present invention is to provide an improved passenger side airbag door and latch assembly that will hold the door in a closed position within an opening in an interior vehicle trim part and which will be released from the door through a wide range of operating temperature conditions.

A feature of the present invention is to provide a passenger side airbag restraint system with a door which is firmly held in a closed position with respect to an adjacent interior trim part and which door is easily separable from the interior trim part without tearing an outer cover, the separation occurring solely in response to airbag inflation for forming an opening therethrough for deployment of an airbag into a vehicle passenger compartment.

A further feature is to provide such a door which is held in place by a releasable latch assembly located at a seam line between the door and an adjacent interior trim part.

A further feature of the present invention is to provide a door for closing an opening in a trim part through which an airbag is deployable upon vehicle impact, and wherein the door is hinged at one end thereof with respect to the interior trim part and is connected at the opposite end thereof with respect to the interior trim part by a releasable latch assembly having coacting parts that will separate at a uniform load level through a range of operating temperatures when an airbag is deployed against the inboard surface of the door.

Yet another object of the present invention is to provide for a door as set forth in the preceding paragraph wherein the door has an inner member formed of deformable metal that includes a crimped end thereon and wherein the crimped end is connected to latch means by a press fit that will release upon impact of an airbag against the inner member for opening the door to allow deployment of the airbag into a vehicle compartment.

Yet another object of the present invention is to provide for such a releasable latch assembly wherein the crimped end is formed as a closed U-bend and the retainer member is formed as an open U-bend having a throat dimension that will press fit against the closed U-bend on the inner door member for providing a releasable connection between the door and the interior trim part that will open at a substantially constant release force irrespective of changes in the temperature of the operating system.

These and other objects, advantages and features of the present invention will be more apparent when taken in conjunction with the following detailed description of the invention along with reference to the accompanying drawings wherein:

BRIEF DESCRIPTION OF THE DRAWINGS

FIG. 2 is an enlarged sectional view taken along the line 2—2 of FIG. 1 looking in the direction of the arrows;

FIG. 3 is a sectional view like FIG. 2 showing the door separated from the instrument panel and the airbag deployed.

DETAILED DESCRIPTION OF THE PREFERRED EMBODIMENT

Figure 1:
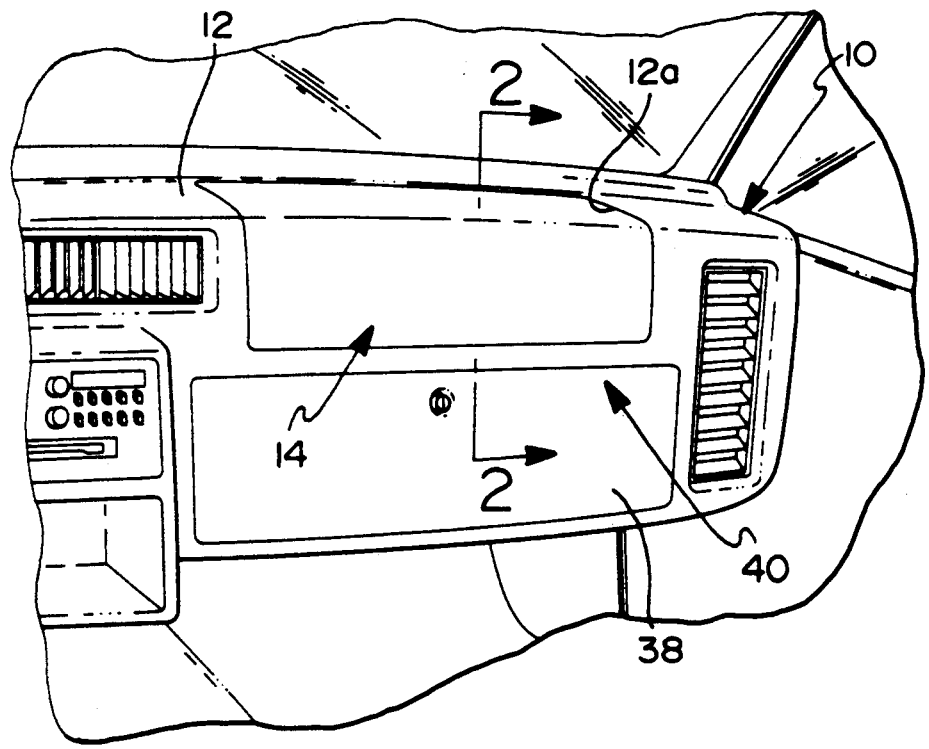
FIG. 1 is a perspective view of an instrument panel including the present invention.

Referring now to FIG. 1, an instrument panel assembly 10 is shown having an outer shell 12 with an opening 12a closed by a door assembly 14 located above an airbag restraint system 16 for deployment into the passenger compartment of a vehicle upon the vehicle sustaining an impact force above a predetermined level. The instrument panel assembly 10 is representative of other interior trim parts for housing airbag restraints, including consoles, glove boxes, seats and door liners and armrests.

The door assembly 14 includes an outer shell or skin 18 which is formed from either urethane or plastisol materials including a thermoplastic resin and a suitable plasticizer, e.g., polyvinyl chloride or thermoplastic elastomers such as styrenic block copolymers, polyurethanes, copolyesters or polyolefins. The outer shell 18 thereby has a similar appearance to the outer shell 12 of the trim part since such outer shells are also formed from the same kinds of materials which form the shell 18.

The outer shell 18 has an inboard surface 20 covered by backing material in the form of a urethane plastic foam layer 22. The foam layer 22 completely covers the surface 20 so that the outer shell 18 has the same appearance as the surface of the instrument panel 10.

An inner member 24 backs the foam layer 22.

The inner member 24 has an inboard surface 26 which is located immediately above the outlet 28 from an airbag housing 30 supported with respect to an instrument panel retainer member 32 by suitable support members not shown. The housing 30 forms a canister for an expandable airbag 34 shown in a preinflation position with the folds of the airbag arranged to expand into impact engagement with the inboard surface 26.

The interior of the airbag 34 is connected with a suitable source of inflatant such as a nitrogen generator 36.

The inner member 24 is preferably formed from a deformable, light weight rigid material such as aluminum. The inner member 24 is engaged by the airbag 34 as it inflates.

The door assembly 14 is closed at a breakline 38 formed in the instrument panel assembly 10 above a crash pad 40.

According to one feature of the present invention, the door assembly 14 is firmly held at the breakline 38 such that the outer surface or shell 18 thereof will be located in close spaced relationship to the outer shell 12 of the instrument panel 10 and the outer shell 40a of the crash pad 40. The fit of the door assembly 14 at one end thereof is maintained by a hinged connection 42. The hinged connection is formed by tail segments 18a and 24a of the outer shell 18 and the inner member 24. The tail segments 18a, 24a are connected by a rivet 44 to a portion of the outer shell 12 at the opening 38 therein. The hinge 42 will yield as shown in FIG. 3 when the door is opened.

Figure 4:
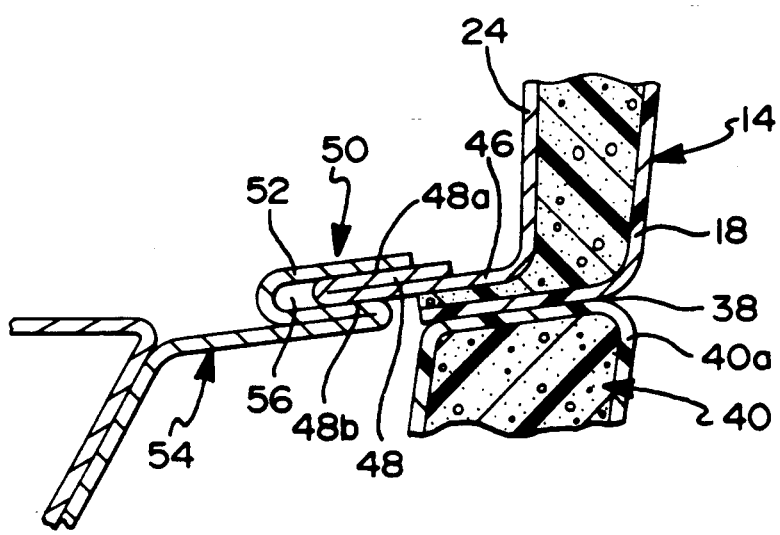
FIG. 4 is an enlarged fragmentary sectional view of a releasable latch in the door assembly of the present invention.

The opposite end of the door 14 includes an extension 46 on the inner member 24. The extension 46 is crimped to form a closed U-bend 48. The closed U-bend 48 forms part of a releasable latch assembly 50 that is shown in enlarged form in FIG. 4. The releasable latch assembly 50 includes an open U-bend 52 formed on the end of a retainer member 54 that is fixed with respect to the door 14 at the free end thereof as, for example, by being connected to the airbag housing 30.

The width W of the open U-bend 52 is selected so that the outer surfaces 48a and 48b of the closed U-bend 46 will be press fit in the open U-bend 52. The press fit produces a retention force that will securely hold the door assembly 14 in a good alignment with the adjacent interior trim parts, e.g., the instrument panel assembly 10 and the crash pad 40. Additionally, the retention force between the closed U-bend 48 and the open U-bend 52 is of a magnitude that will prevent the door assembly 14 from loosening with respect to the adjacent vehicle interior trim parts due to vehicle vibrations and the like.

A further feature of the present invention is that the opening 56 in the open U-bend 52 is formed in the same direction as the impact force that is generated by the airbag 34 when it impacts against the inner surface 26 in response to an impact of the vehicle with another object. Such impact is sensed by known means to quickly release the gas from the generator 36 to cause the bag to expand to impose an opening force on the door 14. The releasable latch assembly 50 will slide open in the direction of the release force imposed on the door imposed by the airbag. The force required to produce a sliding release between the closed U-bend 48 and the open U-bend 52 is a consistent opening force which is the same over the entire operating temperature range of the operative components of the system.

More particularly, in the illustrated arrangement, the constant release force is obtained by crimping the open U-bend 52 against the outer surfaces 48a, 48b of the closed U-bend and the initial crimping force is selected to reduce variations in the opening force thereby to allow for a consistent deployment of the airbag 34 under a wide range of operating conditions.

The releasable latch assembly 50 is configured so that it will release even though there is a secure retention of the door assembly with respect to the interior vehicle trim parts for maintaining a desired aesthetic appearance between the door and the rest of the interior of the vehicle. Nevertheless, the arrangement allows for relatively easy opening of the door compared with systems which require that the material of the outer surface of the vehicle part be torn or separated at weakened sections thereof.

The arrangement enables the grain, color and soft feel formed in present day reaction injection molded interior foam parts to be maintained in the door assembly associated therewith.

Overall, a highly aesthetic, relatively low cost and highly functional door assembly is provided that will separate easily from the interior trim part deployment opening upon vehicle impact.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A door assembly for concealing an opening (12a) to an airbag restraint system (16) including an airbag, a housing (30) for the airbag, a gas generator located in the housing for supplying gas to the airbag in response to vehicle impact, said door assembly comprising:

an outer member (18); a foam member (22) backing said outer member, and an inner member (24) backing said foam member formed from deformable metal and means (44) for joining said foam member and outer member for closing the opening prior to deployment of an airbag into a passenger compartment of a vehicle;

an interior trim member (10) surrounding the opening;

hinge means (42) integrally formed on said inner member and connected to said interior trim member;

releasable latch means (50) for receiving and connecting only said inner member to said housing for holding said inner member within said interior trim member to close said opening with said outer member and said foam member connected to said inner member and closing said opening;

said releasable latch means opening at substantially the same release force throughout the opening temperature range of the vehicle when said airbag inflates to cause said hinge means to deform so as to separate said inner member, said foam member and said outer member from said opening for deployment of the airbag therethrough and into a passenger compartment of a vehicle.

2. The door assembly of claim 1 further characterized by said releasable latch means including a crimped end (48) on said inboard member and means (52) press fit to said crimped end for releasably holding said door assembly with respect to said housing.

3. The door assembly of claim 1 further characterized by said releasable latch means including a crimped end on said inboard member and a retainer member (54) on said housing for releasably holding said crimped end for holding said door assembly with respect to said housing.

4. The door assembly of claim 1 further characterized by said inner member having a closed U-shaped end(46), said releasable latch means including a retainer member (54) having an open U-shaped end (52) for receiving said closed U-shaped end in a press fit relationship for securing said inner member, said foam member and said outer skin member in said opening prior to deployment of said airbag through said opening.

5. An interior trim member (10) having a door (14) for concealing an airbag restraint system (16) including an airbag, an airbag housing (30), a gas generator and a retaining member for supporting the interior trim member on a vehicle frame characterized by:

the interior trim member having an outer shell (12) forming an opening (12a) for deployment of the airbag through said outer shell;

said door having a free end (46) and a hinged end (42); said door located within said interior trim member engageable with said airbag upon initial inflation thereof to cause said door to be displaced upwardly of said interior trim member; and releasable latch means (50) for connecting said free end to said housing for securing said door within said opening prior to deployment of said airbag and including opposing release surfaces (43a, 48b) extending and located axially in line with release forces imposed on said door to allow for a sliding release at said release surfaces to separate said free end and said housing which is insensitive to operating temperature conditions.

6. The door assembly of claim 5 further characterized by said releasable latch means including a crimped end (48) on said free end (46) and means (54) press fit to said crimped end for releasably holding said door assembly with respect to said housing.

7. The door assembly of claim 5 further characterized by said releasable latch means including a crimped end on said inboard member and a retainer member (54) on said housing (30) for releasably holding said crimped end for holding said door with respect to said housing.

8. The door assembly of claim 5 further characterized by said free end (46) having a closed U-shaped end (48), said releasable latch means including a retainer member (54) having an open U-shaped end (52) for receiving said closed U-shaped end in a press fit relationship for securing said inner member, said foam member and said shell member in said opening prior t deployment of said airbag through said opening.

* * * * *